United States Patent
Brunswig et al.

(10) Patent No.: US 8,015,039 B2
(45) Date of Patent: Sep. 6, 2011

(54) ENTERPRISE VERIFICATION AND CERTIFICATION FRAMEWORK

(75) Inventors: Frank Brunswig, Heidelberg (DE); Abhay Tiple, Sandhausen (DE)

(73) Assignee: SAP AG, Walldorf (DE)

(*) Notice: Subject to any disclaimer, the term of this patent is extended or adjusted under 35 U.S.C. 154(b) by 507 days.

(21) Appl. No.: 11/639,673

(22) Filed: Dec. 14, 2006

(65) Prior Publication Data

US 2008/0147455 A1  Jun. 19, 2008

(51) Int. Cl.
- *G06Q 10/00* (2006.01)
- *G06F 9/44* (2006.01)
- *G06F 9/45* (2006.01)

(52) U.S. Cl. ........ 705/7.11; 717/124; 717/126; 717/137

(58) Field of Classification Search ................ 705/7.11; 717/124, 126, 137
See application file for complete search history.

(56) References Cited

U.S. PATENT DOCUMENTS

| | | | |
|---|---|---|---|
| 5,799,086 A * | 8/1998 | Sudia | 705/76 |
| 5,956,403 A * | 9/1999 | Lipner et al. | 713/181 |
| 5,991,406 A * | 11/1999 | Lipner et al. | 380/286 |
| 6,009,177 A * | 12/1999 | Sudia | 713/191 |
| 6,862,696 B1 * | 3/2005 | Voas et al. | 714/38.11 |
| 6,983,221 B2 * | 1/2006 | Tracy et al. | 702/181 |
| 7,010,546 B1 * | 3/2006 | Kolawa et al. | 707/694 |
| 7,055,093 B2 * | 5/2006 | Tozawa et al. | 715/234 |
| 7,082,463 B1 * | 7/2006 | Bradley et al. | 709/223 |
| 7,085,926 B1 * | 8/2006 | Peach | 713/160 |
| 7,089,491 B2 * | 8/2006 | Feinberg et al. | 715/234 |
| 7,171,379 B2 * | 1/2007 | Menninger et al. | 705/28 |
| 7,181,694 B2 * | 2/2007 | Reiss et al. | 715/747 |
| 7,185,235 B2 * | 2/2007 | Radestock | 714/47.1 |
| 7,353,405 B2 * | 4/2008 | Chevalier et al. | 713/168 |
| 7,490,319 B2 * | 2/2009 | Blackwell et al. | 717/124 |
| 7,624,380 B2 * | 11/2009 | Okada | 717/125 |
| 7,739,249 B2 * | 6/2010 | Haham et al. | 707/690 |
| 2001/0050990 A1 * | 12/2001 | Sudia | 380/286 |
| 2003/0009540 A1 * | 1/2003 | Benfield et al. | 709/220 |
| 2005/0021563 A1 * | 1/2005 | Shaburov | 707/104.1 |
| 2006/0048097 A1 * | 3/2006 | Doshi | 717/120 |
| 2007/0006041 A1 * | 1/2007 | Brunswig et al. | 714/38 |
| 2007/0033442 A1 * | 2/2007 | Tillmann et al. | 714/45 |
| 2007/0033443 A1 * | 2/2007 | Tillmann et al. | 714/45 |
| 2007/0086351 A1 * | 4/2007 | Noble et al. | 370/244 |
| 2008/0141333 A1 * | 6/2008 | Chen et al. | 726/1 |

OTHER PUBLICATIONS

Eric Newcomer and Greg Lomow (Understanding SOA with Web Services. Addison-Wesley Professional, Dec. 14, 2004, Print ISBN-10: 0-321-18086-0).*
Iron Mountain Verification Services: Fulfilling the Promise of Technology Escrow Agreements, Iron Mountain Intellectual Property Management, Inc., White Paper (2005).*
Iron Mountain Website—selected pages from Mar. 2005-Mar. 2006, downloaded from Internetarchive.org, Apr. 21, 2009.*

(Continued)

*Primary Examiner* — Lynda C Jasmin
*Assistant Examiner* — George H Walker
(74) *Attorney, Agent, or Firm* — Mintz Levin, Cohn, Ferris, Glovsky, and Popeo P.C.

(57) ABSTRACT

Methods and apparatus, including computer program products, are provided for verifying business objects. In one exemplary aspect, the business object and a predetermined contract defining the business object are received. The received business object is verified based on one or more tests defined by the predetermined contract. Based on the results of the verification of the business object, an indication is provided of whether the business object complies with the predetermined contract.

13 Claims, 4 Drawing Sheets

OTHER PUBLICATIONS

Headstrong Website Nov. 29, 2006 (downloaded from web.archive.com on Jun. 8, 2010).*
Offshore Testing Services Website Nov. 2006-May 2007 (downloaded from web.archive.com on Jun. 8, 2010).*
Edward A. Addy, "A framework for performing verification and validation in reuse-based software engineering" Annals of Software Engineering, Springer Netherlands, Issue vol. 5, No. 1 / Jan. 1998, pp. 279-292, ISSN 1022-7091 (Print) 1573-7489 (Online).*
Reiko Heckel and Marc Lohmann, "Towards Contract-based Testing of Web Services," in Electronic Notes in Theoretical Computer Science (ENTCS), vol. 116 , (Jan. 2005), pp. 145-156, ISSN:1571-0661.*
Tsai, W.T.; Paul, R.; Weiwei Song; Zhibin Cao; , "Coyote: an XML-based framework for Web services testing," High Assurance Systems Engineering, 2002. Proceedings. 7th IEEE International Symposium on , vol., No., pp. 173-174, 2002, Print ISBN: 0-7695-1769-2.*
Bai, X.; Tsai, W.T.; Paul, R.; Feng, K.; Yu, L.; , "Scenario-based modeling and its applications," Object-Oriented Real-Time Dependable Systems, 2002. (WORDS 2002). Proceedings of the Seventh International Workshop on , vol., No., pp. 253-260, 2002, Print ISBN: 0-7695-1576-2.*
Xiaoying Bai; Wenli Dong; Wei-Tek Tsai; Yinong Chen; , "WSDL-based automatic test case generation for Web services testing," Service-Oriented System Engineering, 2005. SOSE 2005. IEEE International Workshop , vol., No., pp. 207-212 Oct. 20-21, 2005 DOI: 10.1109/SOSE.2005.43.*
Jonathan S. Ostroff, Richard F. Paige, David Makalsky, Phillip J. Brooke: "E-Tester: a Contract-Aware and Agent-Based Unit Testing Framework for Eiffel", in Journal of Object Technology, vol. 4, No. 7, Sep.-Oct. 2005, pp. 97-114, http://www.jot.fm/issues/issues 2005 09/article4.*
Wei-Tek Tsai; Yinong Chen; Paul, R.; , "Specification-based verification and validation of Web services and service-oriented operating systems," Object-Oriented Real-Time Dependable Systems, 2005. WORDS 2005. 10th IEEE International Workshop on , vol., No., pp. 139-147, Feb. 2-4, 2005, doi: 10.1109/WORDS.2005.51 URL: http://ieeexplore.ieee.org/stam.*
Valentini, E.; Fliess, G.; Haselwanter, E.; , "A framework for efficient contract-based testing of software components," Computer Software and Applications Conference, 2005. COMPSAC 2005. 29th Annual International , vol. 2, No., pp. 219-222 vol. 1, Jul. 26-28, 2005, doi: 10.1109/COMPSAC.2005.24; URL:http://ieeexplore.ieee.org/stamp/stamp.jsp?tp=&arn.*
Canfora, G.; Di Penta, M.; , "Testing services and service-centric systems: challenges and opportunities," IT Professional , vol. 8, No. 2, pp. 10-17, Mar.-Apr. 2006, doi: 10.1109/MITP.2006.51 URL: http://ieeexplore.ieee.org/stamp/stamp.jsp?tp=&arnumber=1628907&isnumber=34167.*
Jonathan S. Ostroff, Richard F. Paige, David Makalsky, Phillip J. Brooke: "E-Tester: a Contract-Aware and Agent-Based Unit Testing Framework for Eiffel", in Journal of Object Technology, vol. 4, No. 7, Sep.-Oct. 2005, pp. 97-114.*
Egon Valentini. "Development of a Framework for Contract-Based Testing of Software-Components." Master's Thesis, Institute for Information Processing and Computer Supported New Media (IICM), Graz University of Technology, May 2003.*
Dare Obasanjo. "Improving XML Document Validation with Schematron." Sep. 2004, MSDN Library, http://msdn.microsoft.com/en-us/library/aa468554.aspx. downloaded Apr. 14, 2011.*
Chang, H.; Collet, P.; , "Fine-grained contract negotiation for hierarchical software components," Software Engineering and Advanced Applications, 2005. 31st EUROMIRCO Conference on , vol., No., pp. 28-35, Aug. 30-Sep. 3, 2005 doi: 10.1109/EUROMICRO.2005.27.*
Alexander Ananiev. "Using XML Validation Framework with Web Services." myarch.com, Posted on Sep. 18, 2006, downloaded Apr. 14, 2011.*
Chang, H.; Collet, P.; Ozanne, A.; Rivierre, N.; , "Some Autonomic Features of Hierarchica Components with Negotiable Contracts," Autonomic Computing, 2006. ICAC '06. IEEE International Conference on , vol., No., pp. 285-286, Jun. 13-16, 2006 doi: 10.1109/ICAC.2006.1662411.*
Collet, P.; Deveaux, D.; Rousseau, R. "Contract-based testing: from objects to components." Testability Assessment, 2004. IWoTA 2004. Proceedings. First International Workshop on. pp. 5-14 doi: 10.1109/IWOTA.2004.1428408.*
Mike Barnett and Wolfram Schulte. "Runtime verification of .NET contracts." The Journal of Systems and Software 65 (2003) 199-208, doi:10.1016/S0164-1212(02)00041-9.*
Hanna, S.; Munro, M.; , "An Approach for Specification-based Test Case Generation for Web Services," Computer Systems and Applications, 2007. AICCSA '07. IEEE/ACS International Conference on , vol., No., pp. 16-23, May 13-16 2007 doi: 10.1109/AICCSA.2007.370859.*
B. Hailpern and P. Santhanam. "Software debugging, testing, and verification," IBM Systems Journal, vol. 41, No. 1, 2002.*
Wei-Dong Zhu. "Content Manager Validation Utilities." IBM Redbooks, Dec. 22, 2003.*
William McKnight and Dan Stanford. "Data Warehousing Requirements Analysis, Part 2." http://www.information-management.com/issues/20031201/7757-1.html?zkPrintable=true, downloaded Apr. 13, 2011.*
W.T.Tsai; Qian Huang; Bingnan Xiao; and Yinong Chen. "Verification Framework for Dynamic Collaborative Services in Service-Oriented Architecture." Proceedings of the Sixth International Conference on Quality Software (QSIC'06) Oct. 27-28, 2006, Print ISBN: 0-7695-2718-3; doi 10.1109/QSIC.2006.66.*

* cited by examiner

ENTERPRISE VERIFICATION AND CERTIFICATION FRAMEWORK

FIELD

The subject matter described herein generally relates to data processing, and, more particularly, to a verification and certification framework.

BACKGROUND

Enterprise applications are not only high-performance business engines driving efficiencies, but they are also flexible building blocks of business systems. A recent promising solution has risen in the form of services. A service, such as a web service, is a program representing a self-contained, self-describing piece of application functionality that can be found and accessed by other applications. A service is self-contained because the application using the service does not have to depend on anything other than the service itself, and self-describing because the description on how to use the service can be obtained from the service itself. The descriptions of the service are typically centrally stored and accessible through standard mechanisms, such as WSDL (Web Service Description Language).

Instead of requiring programmers to establish and maintain links between applications, services are loosely coupled, making connections simpler and more flexible and allowing application architects to more easily find and understand services offered by other cooperative applications. However, the problem that exists with services is that they are often designed to expose functionality of individual applications and thus are too limited to be efficient building blocks for enterprise-wide business processes. A solution to this shortfall has been the migration to a service oriented architecture (SOA). The SOA is an open architecture middleware, which builds on the benefits of services. The Enterprise Service Framework (ESF), which is commercially available from SAP AG, Walldorf, Germany, is an example of a SOA. The term "framework" refers to a structure of interrelated programs. The term "SOA" may also be used to refer to a distributed objects architecture, such as CORBA (Common Object Request Broker Architecture) and DCOM (Distributed Component Object Model).

The SOA enables the abstraction of business objects (BO), modeled as services (also referred to as enterprise services), from actual applications. Aggregating services into business-level enterprise services may provide more meaningful building blocks for the task of automating enterprise-scale business scenarios. The SOA also enables the use of a repository storing relevant pre-existing enterprise services, which can be made available to selected partners and customers. By using a repository, these selected partners and customers can use the pre-existing enterprise services to aid in the implementation of new services and corresponding business objects. The term business object (BO) represents an object, such as a data structure including data and operations, of significance to a business. Examples of business objects include a purchase order, a sales order, a flight reservation, a shipping order, customer information, employee information, and the like. A service may thus provide an interface to enable other services and applications to access and process (e.g., create, fill-in, save, query, delete, print, send, and the like) the business object. The proliferation of services and business objects as enterprise building blocks will continue, and, as such, software tools are required to facilitate their implementation.

SUMMARY

The subject matter disclosed herein provides methods and apparatus, including computer program products, for providing a verification and certification framework.

In one aspect, there is provided a method for verifying a business object. The business object and a predetermined contract defining the business object are received. The received business object is verified based on one or more tests defined by the predetermined contract defining the business object. Based on the result of the verification of the business object, an indication is provided of whether the business object complies with the predetermined contract. In some variations, a service providing an interface to the business object is verified. The business object may be implemented as a data structure.

Moreover, the verification may be provided as a service. The verification service may receive the business object and the predetermined contract from a repository, verify the business object, and provide the indication from the verification service to a user interface.

In some additional variations, the business object may be verified by executing one or more tests. In some cases, the one or more of the tests may be representative of a transaction. The business object may also be verified by executing one or more tests to determine whether metadata associated with the business object complies with the predetermined contract by, for example, determining whether the number of nodes of the business object complies with the number of nodes defined by the predetermined contract.

The subject matter described herein may be implemented to realize the advantage of allowing a variety of developers to generate services and/or business objects, while ensuring that those developed services and business objects are verified and certified to comply with a predetermined contract for the service or business object.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

DETAILED DESCRIPTION

The implementations set forth in the following description do not represent all implementations consistent with the subject matter described herein. Instead, they are merely some examples consistent with certain aspects related to the described subject matter. Wherever possible, the same reference numbers will be used throughout the drawings to refer to the same or like parts.

Figure 1:
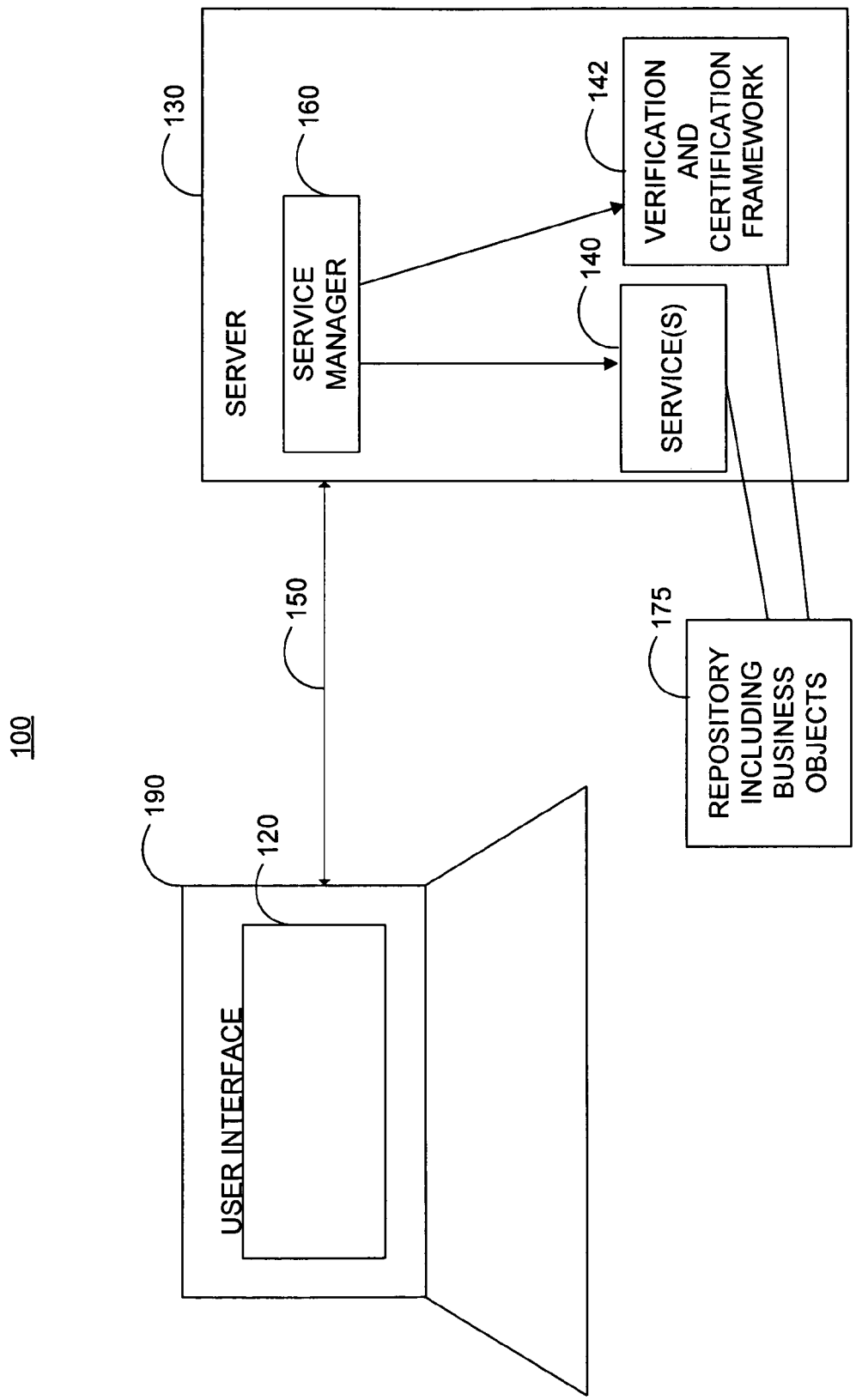
FIG. 1 illustrates a block diagram of an exemplary system including a verification and certification framework.

FIG. 1 is a block diagram of an exemplary system 100 for providing a verification and certification framework. The system 100 includes a client system 190 and a server system 130. The client system 190 further includes a program, such as a user interface 120, for accessing other programs, such as services 140, at server 130 through a communication link 150. The server 130 further includes a verification and certification framework 142 for verifying a service and corresponding business objects stored in repository 175. The server 130 also includes a service manager 160, which may be used in some implementations to call service 140 or verification and certification framework 142.

To verify and certify a service and a business object, the verification and certification framework 142 may use a predetermined contract to verify whether a service and/or business object complies with the predetermined contract for the service and business object. As used herein, the phrase contract refers to an agreement rather than a legally binding contract with offer and acceptance. The predetermined contract may include information specifying the service and the business object. For example, the predetermined contract may include a description, such as a WSDL document, of the interface to the service and include a description, such as an XML description or an XML Schema, of the business object. Moreover, the predetermined contract may include information indicating one or more of the following: allowed methods which may be invoked at the business object, allowed data types at the business object, and the format of any data at the business objects. If the service and corresponding business objects comply with the predetermined contract, the verification and certification framework 142 may indicate that the service and business object are "certified."

Figure 2:
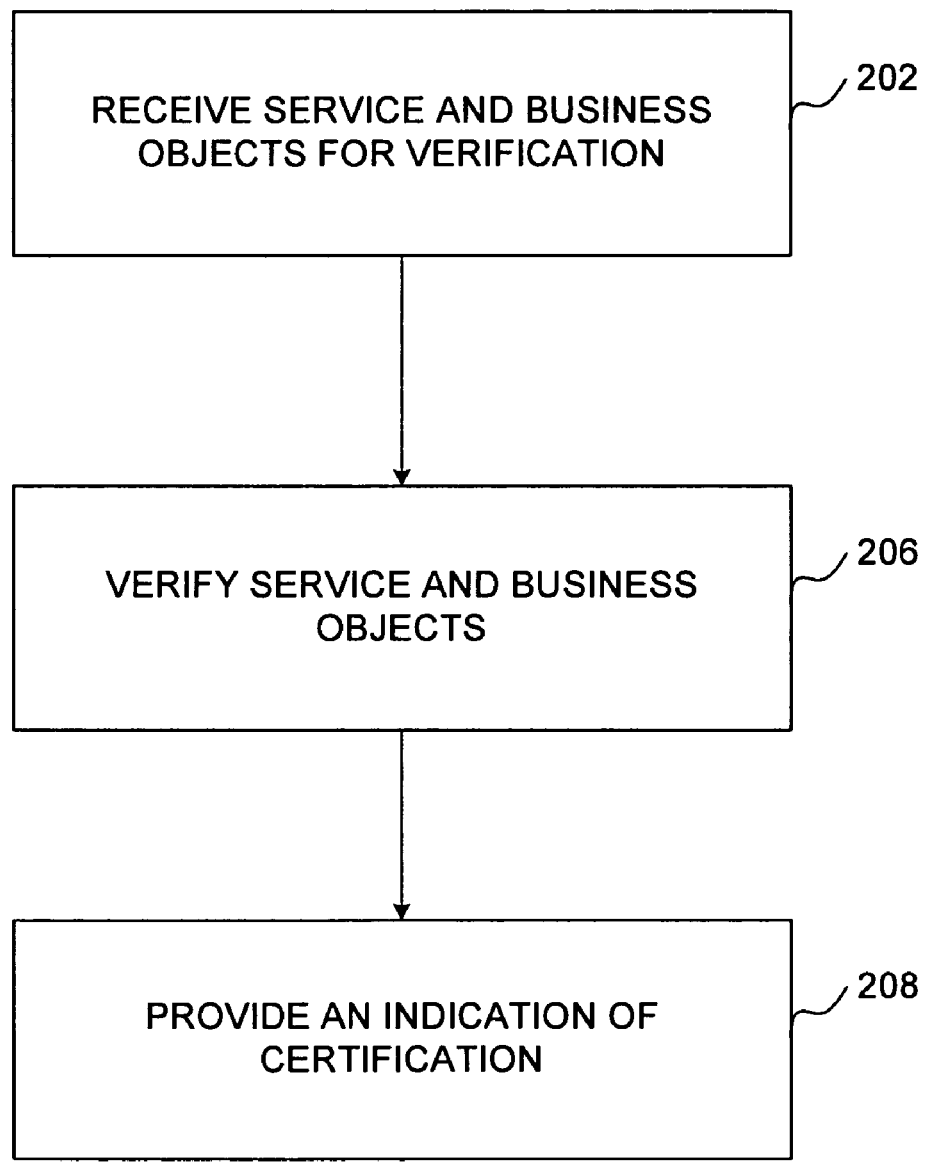
FIG. 2 illustrates a flowchart for verifying and certifying business objects.

FIG. 2 depicts a flowchart of a method 200 for verifying and certifying a service and a business object. At 202, verification and certification framework 142 receives from repository 175 a service and a business object. As used herein, receiving a business object or a service also encompasses receiving an indication as to the location of the business object or service. At 206, verification and certification framework 142 verifies the service and the business object by checking whether the service and business object comply with a predetermined contract defining the service and the business object. For example, the predetermined contract may define the interface of the service as well as the data and methods of the business object. The predetermined contract may thus serve as the basis for any tests of the service and business object. At 208, when the service and business object are verified based on the predetermined contract (e.g., by passing all or some of the tests), the verification and certification framework 142 provides an indication to user interface 120 that the service and business object are certified.

To illustrate by way of an example, a service, such as service 140, may be developed to process sales orders. The sales order service may include an API (application program interface), which when called instantiates one or more corresponding business objects associated with the sales order. At 202, verification and certification framework 142 receives the sales order service and sales order business objects from repository 175. In some implementations, a user at user interface 120 initiates verification and certification of the by sending the sales order service and business objects from repository 175 to verification and certification framework 142. At 206, verification and certification framework 142 performs one or more tests of the sales order service and business objects based on a predetermined contract defining the sales order service and business objects. For example, one of the tests may verify that the sales order business object includes data, such as sales orders, sales order items, and product descriptions for those items. Moreover, one of the tests may verify that the sales order business object has the proper schema (or structure), as described further below with respect to FIG. 3. The tests may also confirm that the API of the sales order service complies with the predetermined contract (e.g., complies with a WSDL document describing that API). Moreover, the tests may be performed in a predetermined sequence to confirm any transactions associated with the service. At 208, verification and certification framework 142 provides an indication, such as a document, that the service and business objects are certified, when verification and certification framework 142 determines that the tests have been satisfied by passing all (or some) of the tests. The use of verification and certification framework 142 allows multiple, disparate developers to create services and business objects while maintaining compliance of the service and business object to a predetermined contract.

Although the above describes verifying and certifying both a service and a business object, verification and certification may instead be performed on either the service or the business object.

Referring again to FIG. 1, system 100 may be implemented as part of an enterprise services framework (ESF). An enterprise services framework is a type of computer framework, such as a client-server architectural framework, that includes one or more services. The services of the ESF are accessible to other parts of the ESF, such as client systems and their corresponding users, through communication links, such as the Internet or an intranet. The ESF may be constructed using tools provided by SAP Netweaver™ (commercially available from SAP AG, Walldorf, Germany). The verification and certification framework 142 may be implemented as a service of the ESF, and, as such, may be called by client systems to verify and certify services and business objects.

Although FIG. 1 shows a single client system 190 and a single server system 130, a plurality of client systems and server systems may be used. Moreover, the elements depicted in FIG. 1 may be distributed among multiple locations. Although FIG. 1 is described with respect to a client-server architecture and an ESF, system 100 can also use any other architecture or framework.

Client system 190 may be implemented as one or more processors, such as computers. Moreover, client system 190 may include a program, such as user interface 120, that enables a user to interact with an application or program, such as service 140 or verification and certification framework 142, at server system 130. The user interface 120 may be implemented as a browser, such as Netscape Navigator or the like, or any other type of graphical user interface. In some implementations, SAP Web Dynpro (commercially available from SAP AG, Walldorf, Germany) may be used as a model-based development environment for generating user interface 120, although other development environments may be used as well.

Communication link 150 may include, alone or in any suitable combination, a telephony-based network, a local area network (LAN), a wide area network (WAN), a dedicated intranet, wireless LAN, the Internet, an intranet, a wireless network, a bus, or any other communication mechanisms. Further, any suitable combination of wired and/or wireless components and systems may provide communication link 150. Moreover, communication link 150 may be embodied using bi-directional, unidirectional, or dedicated communication links. The communication link 150 may also implement standard transmission protocols, such as Transmission Control Protocol/Internet Protocol (TCP/IP), Hyper Text Transfer Protocol (HTTP), SOAP, RPC, or other protocols.

Server system 130 may include one or more processors, such as computers, to interface with other computers, such as client system 190. In some implementations, a service manager 160 at server 130 is implemented to process calls to service 140 or verification and certification framework 142, although user interface may bypass service manager 160.

When service manager 160 is implemented and user interface calls the API of service manager 160, an instance of service manager 160 is created at server system 130. When the API of service manager 160 is called, service manager 160 may also call a procedure to instantiate service 140 and/or verification and certification framework 142. When instantiated by service manager 160, service 140 may also instantiate one or more corresponding business objects. For example, a user of user interface 120 may access service manager 160 and service 140 to interact with a product catalog. The data and methods associated with providing the product catalog to user interface 120 correspond to a business object. The term "node" refers to a portion of the business object. Returning to the above product catalog example, a business object node may refer to another object, such as a price or a product included within the business object.

In some implementations, a service manager 160 instance may include a message handler for handling messages to and from service manager 160; a change handler for handling changes affecting a service or a business object (e.g., changes that occur when user interface 120 changes, such as a button click, that affects a service or the corresponding business objects); and a controller for controlling dynamic properties of the instance (e.g., data fields that are mandatory, read-only, invisible, and the like). The service manager 160 may also include a stack for storing changes associated with the change handler in a last in, first out manner. Although service manager 160 is depicted within server 130, service manager 160 can be located anywhere and distributed among multiple locations.

The repository 175 may store information associated with the business objects (e.g., the product catalog service) including metadata for the business objects. For example, repository 175 may store a list of business object nodes including an identifier (ID) and data content. The ID of a business object refers to an identifying memory address of a business object node that uniquely identifies individual business object nodes within repository 175. The memory address can be used to access and read data content of a particular business object node. For example, an ID of a business object node may consist of a directory structure and filename associated with the business object node. The repository 175 may be implemented as an enterprise services repository, although any other computer-readable storage medium may be used.

The repository 175 may also store metadata regarding business objects. Metadata may be defined as data about data. For example, metadata may refer to information about the data itself, such as content, quality, condition, origin, size, formatting, characteristics of data, and the like. The extensible Markup Language (XML) is a specific example of metadata because it is a format used to define other data objects. Metadata may include a schema. A schema is the organization or structure, such as the organization of a database or the structure of an object in an object-oriented program. In object oriented programming, modeling (i.e., the analysis of objects that are used in a business or other context and the identification of the relationships among these data objects) leads to a schema, which can be stored in repository 175 as a schema. The schema can be depicted visually as a structure or a formal text-oriented description (e.g., script). The metadata may include information such as the number of nodes in a business object, the name(s) of the nodes, the position of a node in a business object hierarchy, the structure of a node, associations, actions, queries on a node, and the nature of a business object.

In some implementations, the predetermined contract for a service or business object may be representative of metadata. For example, the predetermined contract may specify one or more of the following metadata: the number of nodes in a business object, the name(s) of the nodes, the position of a node in the business object hierarchy, the structure of a node, associations, actions, queries on a node, and the nature of a business object.

The service 140 may be implemented as a program or a component, i.e., a small binary object (e.g., an applet) or program that performs a specific function and is designed in such a way to easily operate with other components and applications. Moreover, service 140 may be implemented as a self-contained, self-describing piece of program functionality that can be found and accessed by other programs. Although a service may be accessed through the Internet (or web), a service may be implemented to be accessible from an intranet or from an ESF.

The verification and certification framework 142 may be implemented as a program or a component, and may include an API, which when called performs verification and certification of a service and/or business objects. In some implementations, verification and certification framework 142 may perform one or more tests designed to verify the service and business object. The tests may also be performed in a predetermined sequence to test a transaction associated with the service or business object. For example, the test sequence may verify the following transaction at a service for processing sales orders: creating a sales order, inputting data into the sales order, finalizing the sales order, and saving the sales order to a database. Although the verification and certification framework 142 may test a business object using actual (or historical) data, in some implementations, mock data (i.e., simulated data) is used. For example, if data is required from a user, program, or other business object, the verification and certification framework 142 may generate and provide the mock data, which may be generated based on a pattern or randomly generated.

The verification and certification framework 142 may check one or more of the following aspects of a business object or service: whether a business object is allowed to access another business object; whether an implementation of the business object is service compliant or not (e.g., when a retrieve call is made to certain nodes, whether the service returns data only for the nodes which were requested); whether the time taken to execute a service is within a predetermined time limit; and whether the business object works consistently when a sequence of transactions or services are called.

The verification and certification framework 142 may also include a random data generator to create random data for use when verifying a service or business object. The verification and certification framework 142 may also allow the generation of tests (or test sequences). For example, a set of tests of a service or business object may be defined and developed using predefined templates and/or models.

When performing checks of a service or business object, the verification and certification framework 142 may generate performance data, which may be stored in repository 175 and made available for other tests.

At the end of a verification, verification and certification framework 142 may generate a formatted report showing the tests performed and any test results. The verification and certification framework 142 may also store in repository 175 lists of test performed as well as any test results.

In some implementations, verification and certification framework 142 may also provide a percentage of compliance. For example, if 30 tests are performed and only 3 fail, the compliance percentage may be 90%. Moreover, a service or business object that fails some tests may still be certified. For example, if 100 tests are performed and 2 tests fail, a 98% compliance percentage may be considered sufficient for certification. Alternatively, if the tests are considered "minor," certification may be provided in that case as well.

The verification and certification framework 142 may also include security features to restrict access and confirm authorization to access the verification and certification framework 142. For example, a password may be required to use verification and certification framework 142. The verification and certification framework 142 may also enabled scheduling of verification testing per user defined date, time, frequency, and the like.

Figure 3:
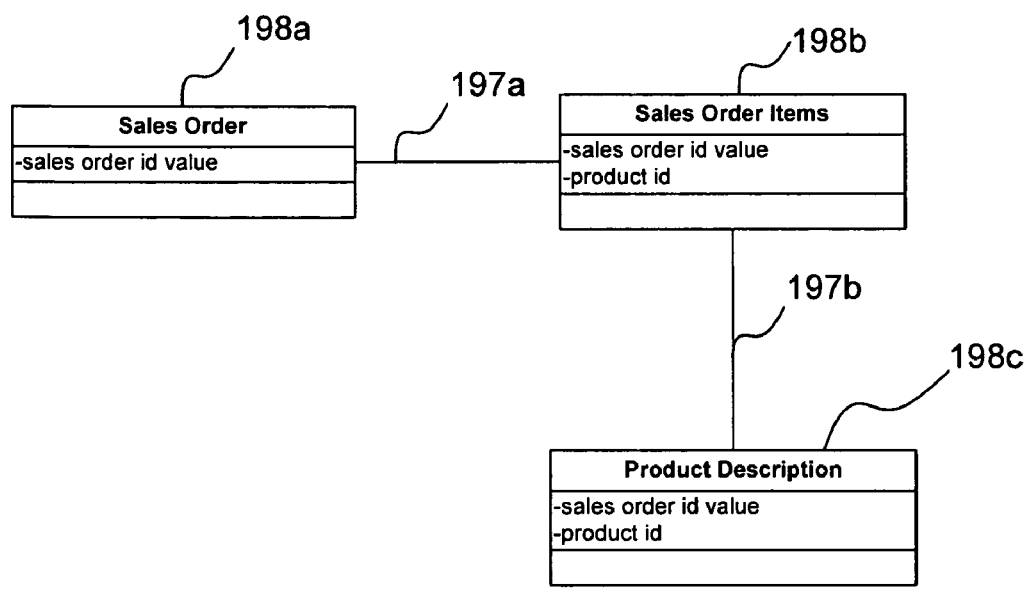
FIG. 3 illustrates an exemplary schema of a business object.

As noted above, the verification and certification framework 142 may check the schema of a business object. FIG. 3 depicts an example schema for a business object 300 including three business object nodes, namely a sales order 198*a*, sales order items 198*b*, and product description 198*c*. Moreover, the schema depicted in FIG. 3 may include keys 197*a-b* that identify the relationships among the business object nodes 198*a-c*. For example, key 197*a* is a sales order identification ("id") value that is used to link business object nodes 198*a* and 198*b*, while key 197*b* links the product identification values (labeled at FIG. 3 as "product id") of sales order item 198*b* and product description 198*c*. The schema, which depicts business object nodes and how they are associated to one another, may be considered metadata and stored in repository 175. Moreover, the predetermined contract may specify various aspects of business object 300 to enable verification and certification framework 142 to verify business object 300. For example, the predetermined contract may specify one or more of the following: a sales order service when instantiated includes 3 business object nodes; the node of the business object are sales order 198*a*, sales order items 198*b*, and product description 198*c*; keys 197*a-b*; and the data types of data in nodes 198*a-c*.

Figure 4:
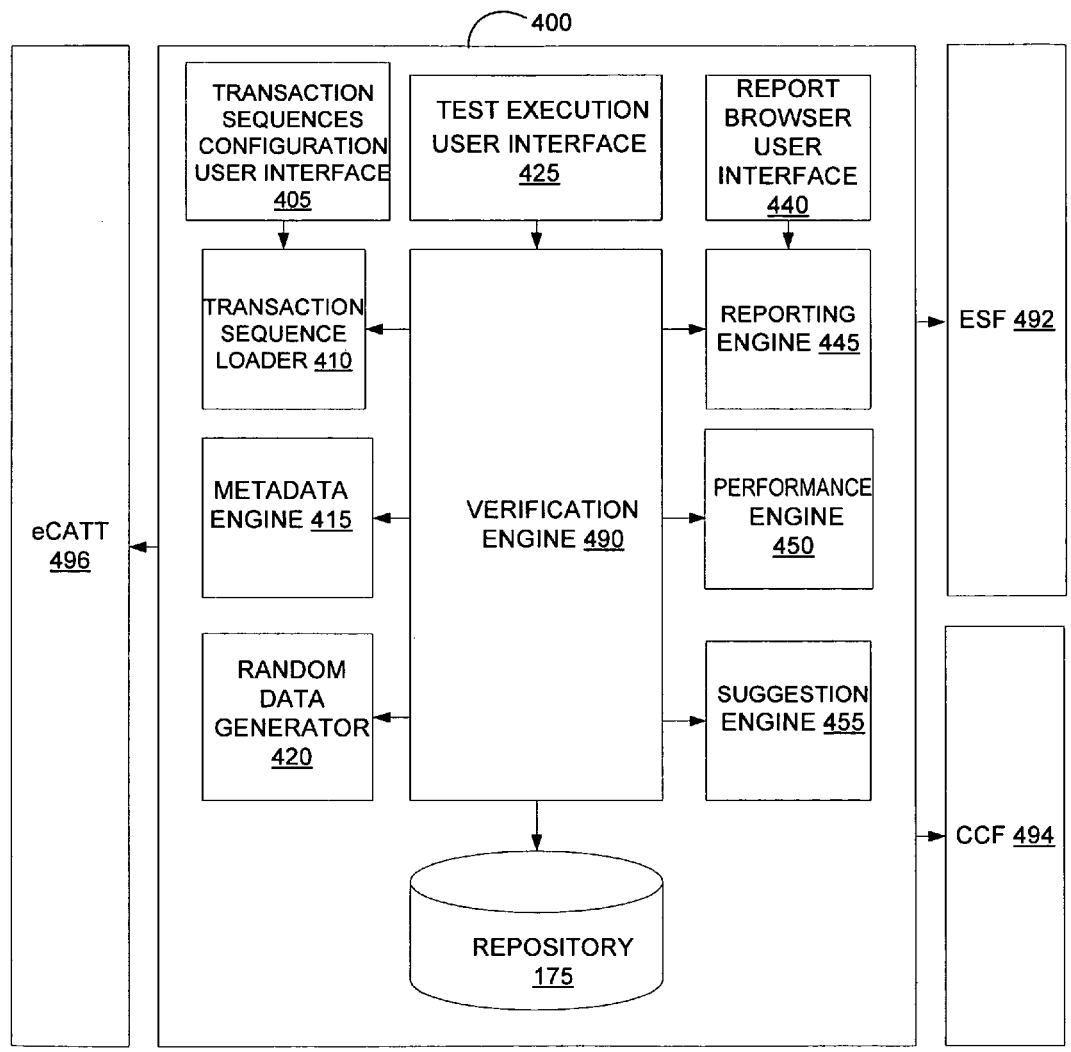
FIG. 4 illustrates another block diagram of a verification and certification framework.

FIG. 4 depicts an exemplary implementation of a verification and certification framework 400. The verification and certification framework 400 may be implemented as a program, application, or component. As described above, the verification and certification framework 400 may also be implemented as a service of an ESF 492.

The verification and certification framework 400 includes the following components: a verification engine 490, a transaction sequences configurator user interface 405, a transaction sequences loader 410, a metadata engine 415, a random data generator 420, a test execution user interface 425, a report browser user interface 440, a reporting engine 445, a performance engine 450, a suggestion engine 455, and a repository 175.

In some implementations, the verification framework 400 may access a Conformance Control Framework (CCF) 494 and an eCATT 496. The CCF 494 may be used to provide runtime checks of business objects. The eCATT 496 is an application for regression testing of an infrastructure. For example, eCATT 496 may be used eCATT to perform automated tests for the verification and certification framework in cases where a user input is desired during the runtime of the test.

The verification engine 490 controls the verification and certification framework 400 including its components 405-455 to provide verification and certification of services and business objects. For example, the verification engine 490 may call transaction sequences loader 410 to load one or more tests, call the random data generator 420 to create mock data (i.e., simulated data), and call the eCATT 496 for running the tests.

The transaction sequences configurator 405 can be used to select one or more methods to be performed on a business object and then the transaction sequences configurator 405 may define an order of execution. For example, transaction sequences configurator 405 may defined a transaction sequence as follows: a query of a business object, a retrieve of the business object, and a modify of the business object.

The transaction sequence loader 410 loads tests including tests of a transaction sequence of a business object. The verification engine 490 controls testing by making calls in sequence to the service and business object. A default set of common transaction sequences may be stored at repository 175 and made available to a user of user interface 120. An example of a common transaction sequence is as follows: query a business object, retrieve from the business object, modify the business object, check the business object so that other business objects and services cannot access it, finalize the business object to ensure that the proper data state is achieved, and then save the business object.

The metadata engine 415 provides to the verification engine 490 metadata of the service and/or business object. The metadata may be in the form of node structure, node names, names of operations (e.g., functions), data format, data type, and the like. The metadata may also be used when creating mock data for business objects. The metadata engine 415 also performs a test for the consistency of the metadata of the business object. In some implementations, a metadata API is used to retrieve metadata information for the service and/or business object.

The random data generator 420 may be called by the verification engine 490 to provide data for use during testing of a service or business object. For example, the random data generator 420 may provide data to serve as user input for a test.

The test execution user interface 425 may enable loading of test patterns and other test relevant parameters and then execution of the tests as part of verification.

The report browser 440 accesses the results of previously tests. The report browser may also be used to determine the variation of test results over a period of time—enabling trend detection.

The reporting engine 445 formats and collates data collected by performance engine 450. The reporting engine 310 also generates reports including a logging report, a delta report to show changes when compared to a previous report, and an audit report to show errors or faults.

The performance engine 450 tracks and stores the performance details of verification testing. The performance engine may determine the amount of time taken by a service executing a given method, such as a query or a retrieve. The amount of time may then be used to assess the performance of a service or business object implementation.

The suggestion engine 455 provides assistance when an error occurs during a test. For example, if a verification test indicates that the format of a business object name is incorrect, suggestion engine 455 provides to user interface 120 the proper format for a business object name.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other aspects are within the scope of the following claims.

What is claimed is:

1. A method for verifying a business object, the method comprising:
   providing a verification service implemented using a processor-based computing system;
   receiving at the verification service implemented using the processor-based computing system the business object and a predetermined contract defining the business object from a repository, the contract including information indicating one or more of allowed methods which are invoked at the business object, allowed data types at the business object, the number of nodes of the business object, the position of the nodes in a hierarchy of the business object, and the format of any data at the business object, the business object including one or more of a purchase order, a sales order, a flight reservation, a shipping order, customer information, and employee information;
   verifying at the verification service implemented using the processor-based computing system the business object based on tests defined by the predetermined contract defining the business object, the verifying comprising:
      generating mock data based at least in part on the metadata of the business object, performing with the business object, by the processor-based computing system, a pre-determined sequence of the tests representative of one or more transactions, the pre-determined sequence of the tests including one or more tests to cause the business object to receive business-related data for use by the business object and to produce by the business object test results with the business related data including the mock data,
      performing at least another test with the business object to: determine whether the business object is allowed to access another object and verify that the business object, when instantiated, has a structure as specified in the predetermined contract,
      determining whether metadata associated with the business object complies with the predetermined contract by determining whether the number of nodes of the business object and the positions of the nodes in the hierarchy of the business object complies with the predetermined contract, and whether one or more of the names of the nodes, and the association of the nodes comply with the predetermined contract; and
   providing an indication from the verification service implemented using the processor-based computing system to a user interface of whether the business object complies with the predetermined contract based on the result of the verifying step.

2. The method of claim 1, further comprising: verifying a service providing an interface to the business object.

3. The method of claim 1, further comprising: receiving the business object defined as a data structure.

4. The method of claim 1, wherein verifying further comprises: verifying the business object by executing the one or more tests.

5. The method of claim 1, wherein verifying further comprises: verifying the business object by executing one or more tests to determine whether metadata associated with the business object complies with the predetermined contract.

6. An article comprising a machine-readable medium embodying instructions that when performed by one or more machines result in operations comprising:
   providing a verification service implemented using a processor-based computing system;
   receiving at the verification service implemented using the processor-based computing system the business object and a predetermined contract defining the business object from a repository, the contract including information indicating one or more of allowed methods which are invoked at the business object, allowed data types at the business object, the number of nodes of the business object, the position of the nodes in a hierarchy of the business object, and the format of any data at the business object, the business object including one or more of a purchase order, a sales order, a flight reservation, a shipping order, customer information, and employee information;
   verifying at the verification service implemented using the processor-based computing system the business object based on tests defined by the predetermined contract defining the business object, the verifying comprising:
      generating mock data based at least in part on the metadata of the business object, performing with the business object, by the processor-based computing system, a pre-determined sequence of the tests representative of one or more transactions, the pre-determined sequence of the tests including one or more tests to cause the business object to receive business-related data for use by the business object and to produce by the business object test results with the business related data including the mock data, performing at least another test with the business object to: determine whether the business object is allowed to access another object and verify that the business object, when instantiated, has a structure as specified in the predetermined contract, determining whether metadata associated with the business object complies with the predetermined contract by determining whether the number of nodes of the business object and the positions of the nodes in the hierarchy of the business object complies with the predetermined contract, and whether one or more of the names of the nodes, and the association of the nodes comply with the predetermined contract; and providing an indication from the verification service implemented using the processor-based computing system to a user interface of whether the business object complies with the predetermined contract based on the result of the verifying step.

7. The article of claim 6, further comprising: verifying a service providing an interface to the business object.

8. The article of claim 6, further comprising: receiving the business object as a data structure representative of a business function.

9. The article claim 6, wherein verifying further comprises: verifying the business object by executing the one or more tests.

10. The article of claim 6, wherein verifying further comprises: verifying the business object by executing one or more tests to determine whether metadata associated with the business object complies with the predetermined contract.

11. A system for verifying a business object, the system comprising:
a processor; and
a memory, wherein the processor and the memory are configured to perform a method comprising:
providing a verification service implemented using a processor-based computing system;
receiving at the verification service implemented using the processor-based computing system the business object and a predetermined contract defining the business object from a repository, the contract including information indicating one or more of allowed methods which are invoked at the business object, allowed data types at the business object, the number of nodes of the business object, the position of the nodes in a hierarchy of the business object, and the format of any data at the business object, the business object including one or more of a purchase order, a sales order, a flight reservation, a shipping order, customer information, and employee information;

verifying at the verification service implemented using the processor-based computing system the business object based on tests defined by the predetermined contract defining the business object, the verifying comprising:
generating mock data based at least in part on the metadata of the business object, performing with the business object, by the processor-based computing system, a pre-determined sequence of the tests representative of one or more transactions, the pre-determined sequence of the tests including one or more tests to cause the business object to receive business-related data for use by the business object and to produce by the business object test results with the business related data including the mock data, performing at least another test with the business object to: determine whether the business object is allowed to access another object and verify that the business object, when instantiated, has a structure as specified in the predetermined contract, determining whether metadata associated with the business object complies with the predetermined contract by determining whether the number of nodes of the business object and the positions of the nodes in the hierarchy of the business object complies with the predetermined contract, and whether one or more of the names of the nodes, and the association of the nodes comply with the predetermined contract; and providing an indication from the verification service implemented using the processor-based computing system to a user interface of whether the business object complies with the predetermined contract based on the result of the verifying step.

12. The system of claim 11, further comprising: verifying a service providing an interface to the business object.

13. The system of claim 11, further comprising: receiving the business object as a data structure representative of a business function.

* * * * *